United States Patent
Campbell et al.

(10) Patent No.: US 9,828,115 B2
(45) Date of Patent: Nov. 28, 2017

(54) METHOD AND SYSTEM FOR COORDINATING REMOVAL OF CONTAMINATION FROM SURFACE OF AIRCRAFT

(71) Applicant: JCAI Inc., Mississauga (CA)

(72) Inventors: Jeffrey P. Campbell, Cambridge (CA); David Bambrick, Mississauga (CA)

(73) Assignee: JCAI Inc., Mississauga, Ontario (CA)

( * ) Notice: Subject to any disclaimer, the term of this patent is extended or adjusted under 35 U.S.C. 154(b) by 0 days.

(21) Appl. No.: 14/484,349

(22) Filed: Sep. 12, 2014

(65) Prior Publication Data

US 2015/0081141 A1    Mar. 19, 2015

Related U.S. Application Data

(60) Provisional application No. 61/877,400, filed on Sep. 13, 2013, provisional application No. 61/953,208, filed on Mar. 14, 2014.

(51) Int. Cl.
| | |
|---|---|
| *B64F 5/00* | (2017.01) |
| *B64F 5/20* | (2017.01) |
| *B64F 5/23* | (2017.01) |
| *G06F 19/00* | (2011.01) |

(52) U.S. Cl.
CPC .............. *B64F 5/0054* (2013.01); *B64F 5/20* (2017.01); *B64F 5/23* (2017.01)

(58) Field of Classification Search
CPC ........ B64F 5/00; B64F 5/0054; B64F 5/0018; B64F 15/20; H02N 1/002; B05B 1/24; G06Q 10/06

USPC .............. 701/3, 9, 34.4; 244/134 F; 348/128
See application file for complete search history.

(56) References Cited

U.S. PATENT DOCUMENTS

| | | | | |
|---|---|---|---|---|
| 5,180,122 | A * | 1/1993 | Christian et al. ......... | 244/134 F |
| 6,092,765 | A * | 7/2000 | White ....................... | 244/134 R |
| 6,636,581 | B2 * | 10/2003 | Sorenson ......................... | 378/58 |
| 7,069,121 | B1 * | 6/2006 | Cummings, Jr. ...... | G01C 23/00 340/8.1 |
| 8,571,747 | B2 * | 10/2013 | Zimpfer ................. | G06Q 10/06 701/29.1 |
| 8,982,207 | B2 * | 3/2015 | Jang .............................. | 348/128 |

(Continued)

FOREIGN PATENT DOCUMENTS

CN            101100222          1/2008

OTHER PUBLICATIONS

Siv.Ing. Haakon Wiig As, "Deco Deicing Management System", Dec. 31, 1998, downloaded May 7, 2015 from http://www.deicing.info/Microsoft PowerPoint-DecoIntro.pdf.

(Continued)

*Primary Examiner* — Tan Q Nguyen

(57) ABSTRACT

A method for coordinating contamination removal on a surface of an aircraft, comprising receiving an electronic contamination removal request, determining location for contamination removal treatment, electronically transmitting location for contamination removal treatment to aircraft, electronically receiving progress of contamination removal treatment, and electronically transmitting progress of contamination removal treatment to aircraft, wherein the progress of contamination removal treatment is displayed on multiple displays to allow for close monitoring of the contamination removal treatment.

17 Claims, 22 Drawing Sheets

(56) References Cited

U.S. PATENT DOCUMENTS

| | | | |
|---|---|---|---|
| 9,031,311 B2* | 5/2015 | Tillotson | 382/141 |
| 2005/0090969 A1 | 4/2005 | Siok et al. | |
| 2007/0040064 A1* | 2/2007 | Lee | B64F 5/0063 244/134 R |
| 2013/0073419 A1* | 3/2013 | Marwedel | B64F 5/0045 705/26.5 |

OTHER PUBLICATIONS

Vestergaard Company A/S, "De-Icing System Data Transmission System—DTS", Mar. 27, 2009, downloaded May 7, 2015 from http://vestergaardcompany.com/vesterhjem/wp-content/uploads/2013/11/dts1.pdf.

Mäkelä, "Developing of Aircraft De-Icing Operations at Helsinki Airport", May 31, 2010, downloaded Jul. 7, 2015 from https://publications.theseus.fi/bitstream/handle/10024/16632/Thesis Ready Mikko Makela.pdf.

Mitteldeutsche Airport Holding, "Aircraft De-icing at Leipzig/Halle Airport—Standard Deicing Setup", Aug. 21, 2012, downloaded May 7, 2015 from https://www.leipzig-halle-airport.de/mediapool/standard_deicing_setup_rev_04_vom_21-08-2012.pdf.

European Patent Office, Extended European Search Report for European Patent Application No. 14003155.0, May 18, 2015.

* cited by examiner

METHOD AND SYSTEM FOR COORDINATING REMOVAL OF CONTAMINATION FROM SURFACE OF AIRCRAFT

CROSS-REFERENCE TO OTHER APPLICATIONS

This application claims the benefit of U.S. Provisional Application Nos. 61/877,400 and 61/953,208 filed Sep. 13, 2013 and Mar. 14, 2014 respectively.

FIELD

The present disclosure relates generally to aircraft. More particularly, the present disclosure relates to a system and method for coordinating removal of contamination from surface of an aircraft.

BACKGROUND

In the field of aviation, accumulation of snow, ice, frost, sleet, and the like (collectively 'contamination') on a surface of an aircraft can pose problems. Contamination accumulation can effectively change the shape of the surface and disrupt airflow across the surface, thus hindering the ability to create lift and the ability to maneuver the aircraft. Hence, contamination is usually required to be removed from these surfaces prior to flight for reasons of safety, performance and operability.

In order to remove and counteract the accumulation of contamination, planes are generally treated with de-icing, anti-icing, or both, prior to flight. De-icing is the process of removing contamination that has accumulated on a surface of an aircraft. De-icing techniques may include mechanical methods, such as scraping or brushing, application of heat, application of chemicals, or a combination of the above. Generally, de-icing chemicals are designed to lower the freezing point of water and may be, for example: inorganic salts such as sodium chloride; organic compounds such as potassium acetate; and alcohols such as methanol and glycerol.

Anti-icing is generally the application of chemicals that, at least temporarily, remain on a surface of an aircraft to delay or reduce the accumulation of contamination. Anti-icing is generally useful when there is active precipitation in order to provide a protective coating over the surface to reduce contamination from adhering to the aircraft surface. An example of anti-icing chemicals is propylene glycol based fluids which are applied to retard the future development of contamination accumulation. Anti-icing fluids may also provide "holdover" protection against accumulation while the aircraft is on the ground prior to takeoff. In some cases, both de-icing and anti-icing techniques may be applied to an aircraft.

Therefore, there is provided a novel system and method for coordinating removal of contamination from surface of an aircraft.

SUMMARY

It is an object of the present disclosure to obviate or mitigate at least one disadvantage of previous method and apparatus for coordinating removal of contamination from surface of aircraft.

In one aspect, there is provided a method for coordinating contamination removal on a surface of an aircraft, the method including receiving an electronic contamination removal request, determining location for contamination removal treatment, electronically transmitting location for contamination removal treatment to aircraft, electronically receiving progress of contamination removal treatment, and electronically transmitting progress of contamination removal treatment to aircraft, wherein the progress of contamination removal treatment is displayed on multiple displays to allow for close monitoring of the contamination removal treatment.

In another aspect, there is provided a method for coordinating contamination removal for a surface of an aircraft, the method including receiving status of qualified contamination removal personnel, determining aircraft to receive a contamination removal treatment, transmitting aircraft data to contamination removal personnel, and receiving progress of contamination removal treatment from the contamination removal personnel.

In another aspect, there is provided a system for coordinating contamination removal off a surface of an aircraft by contamination removal personnel, the system including a request module adapted to receive a request for contamination removal, a coordination module adapted to direct the aircraft and the contamination removal personnel for contamination removal, and a de-icing module adapted to track the contamination removal treatment.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for coordinating removal of contamination from the surface of aircraft. The contamination removal may also include the prevention or reduction of contamination on the surface. One example of contamination removal is de-icing. Commonly, de-icing may take place at a number of locations depending upon the weather conditions and the airport's configuration. De-icing may take place at the 'Gate' where the aircraft is docked prior to loading and take-off. De-icing may take place at a designated section of the apron or taxiway known as a 'Stand'. As well, de-icing may take place at a specially designed area such as a Central de-icing Facility (CDF). At the CDF, multiple aircraft may be de-iced at the same time as multiple areas known as de-icing 'Bays' are set up where each aircraft may be de-iced. In some cases, the CDF area is controlled by an organization or separate department of the airport authority. The controller in charge of aircraft movement in this area is often referred to as a Pad Controller or Central Tower Manager (CTM), although this may also be an automated process.

Figure 1:
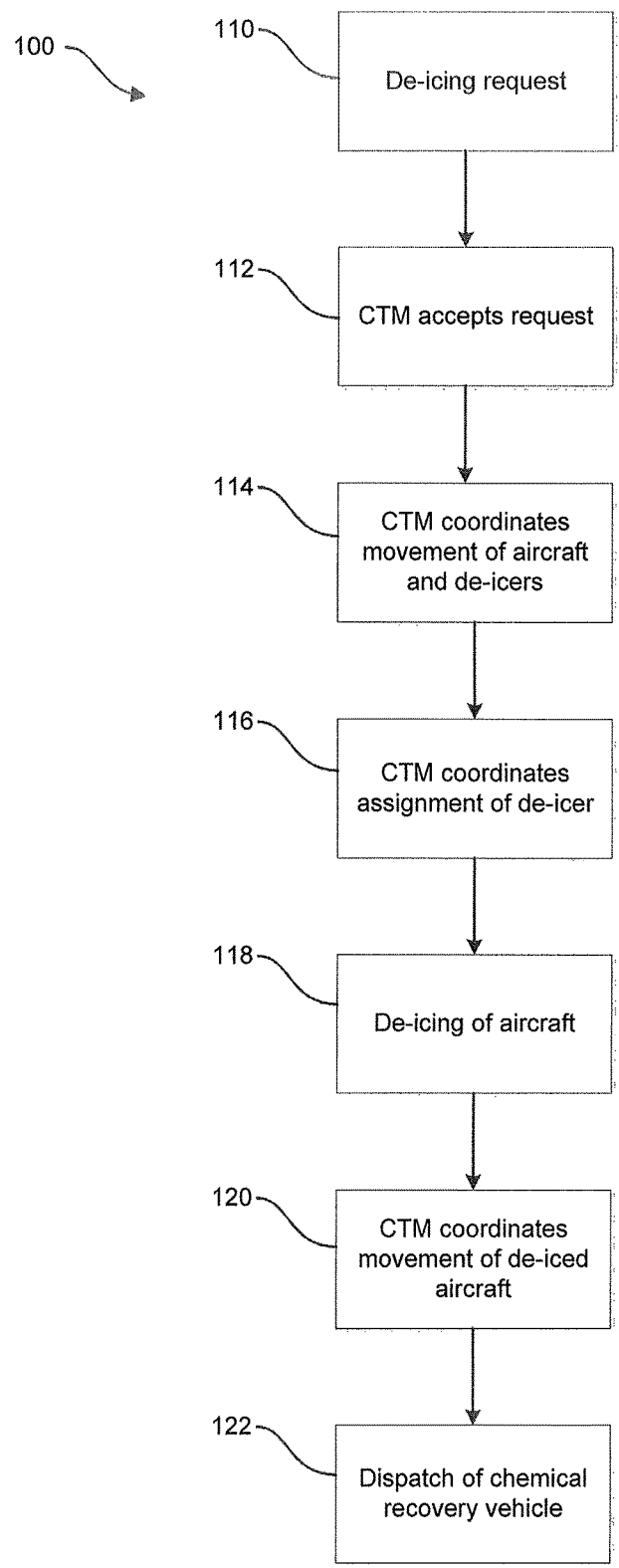
FIG. 1 is a flowchart illustrating a conventional method of coordinating de-icing of aircraft.

Turning to FIG. 1, a conventional method 100 of coordinating de-icing of an aircraft is illustrated.

At 110, a pilot or co-pilot of the aircraft requests de-icing for the aircraft over a radio. The pilot will generally make an assessment of the state of the aircraft and make a request for de-icing based on this assessment. The pilot contacts a de-icing service provider with the request.

At 112, the CTM, or other representative of the de-icing service provider, receives the request from the pilot for de-icing. Typically, the CTM or a designate of the service provider records the request in writing using pen and paper or electronically as a text description of the service to be provided.

The CTM records information about the aircraft and the request, for example: Aircraft Civil ID, which is a unique code/set of numbers and letters uniquely identifying the aircraft as set out by worldwide and local standards bodies; surfaces of the aircraft to be treated; and type of treatment requested/required. The types of treatment will either be de-icing, anti-icing, or a combination of both. In the disclosure herein, reference to de-icing may be understood to include de-icing, anti-icing, or a combination of de-icing and anti-icing. Aircraft information such as size may be requested or derived from the Civil ID, which identifies the make and model of aircraft. In some cases, this may be required for larger aircraft as the locations in which they can be de-iced may be limited. In some cases the information about the aircraft is imported, or copied from an airport supplied system known as flight information display system (FIDS) or electronic flight data system (EFIDS).

At 114, the CTM or other designate of the de-icing service provider may schedule the de-icing resources required and decide the location of the de-icing. If the de-icing is to be carried out at a Stand or CDF, the pilot may be notified, and a person in the control tower (Tower) or ground controller may also be notified. When the aircraft pushes back from the gate, the Tower may co-ordinate the movement of the aircraft until it reaches a zone of the airport in which the CTM is responsible for the aircraft movement; usually when the aircraft enters the Stand or CDF. The zone is marked off by agreed upon entry and exit point(s). The entry point is known as an Inbound Control Point (ICP), and the exit known as an Outbound Control Point (OCP). Once the aircraft arrives at the ICP, the control of the aircraft is handed off to the CTM via radio and the de-icing treatment type is confirmed over the radio. The pilot may then be informed to contact the CTM at a specific radio frequency.

After the pilot contacts the CTM, the CTM may guide the aircraft through the CDF or Stand. The CTM will usually advise the pilot where to taxi within the CDF, eventually assigning the aircraft to a location, such as a Bay or Pad, for de-icing. The instructions from the CTM may include several stops, queues, and other instructions. Once the pilot has taxied and stopped at the designated location, the pilot may be instructed to configure the aircraft for de-icing and engage the parking brakes. The CTM may advise the pilot to contact CTM when the pilot is ready having set the brakes and the aircraft is properly configured for de-icing.

At 116, the CTM co-ordinates the de-icing resources to ensure the completeness of the de-icing process. In some airports, the CTM may hand off control to a another individual to co-ordinate the de-icing resources. This individual may then hand control of the aircraft back to the CTM when de-icing is complete. This handoff, and the accompanying information about the aircraft, is typically communicated over radio.

At 118, a person(s) known as a 'contamination removal personnel(s)' de-ices the aircraft. The contamination removal personnel uses specially designed vehicles to de-ice (and as required anti-ice) the aircraft to clear it of contamination (and prevent contamination from reforming on the surfaces prior to takeoff). Depending on the de-icing and anti-icing techniques used, this may involve having the contamination removal personnel spray the aircraft with liquid de-icing chemicals. The CTM or individual coordinating the de-icing coordinates the contamination removal personnels, assigning them to the location of the de-icing and providing them with instructions on which surfaces to de-ice and with which fluids. The contamination removal personnel typically receives his instructions, and the information about the aircraft, verbally over the radio.

While the aircraft is being de-iced, there is typically some positive hold indicator required. Often, indication is performed by parking a vehicle with a flashing light in front of the aircraft.

Usually, the amount and type of fluid used for de-icing is recorded by the contamination removal personnels either manually, electronically by text systems, or, where available, by automated vehicle vendor data systems located in the vehicles. The tracking of vehicle information is often by pen and paper and at the end of a shift. If the vehicles do not have vehicle vendor data systems, the contamination removal personnels monitor the fluid level and communicate it to the CTM or individual coordinating the de-icing via radio.

Management of the liquid chemicals in the storage tanks are often tracked manually by the CTM or contamination removal personnels. This is typically tracked through reporting receipts and usage. Chemical recovery is typically tracked through manual logs, paper forms, and waybills.

At 120, the individual coordinating the de-icing, then informs the pilot to contact the CTM for movement co-ordination. The CTM may be contacted by the pilot on a specific frequency over the radio. The CTM guides the aircraft, via radio, to exit the CDF at the appropriate OCP. When the pilot arrives at one of the OCP's, the pilot re-contacts the CTM. The CTM then hands control back to the Tower by informing the pilot to contact tower or ground control at a specific radio frequency. The aircraft, when instructed to by the Tower, then leaves the CDF.

There is a limit to the amount of liquid chemical that can be sprayed in a region of the CDF. Thus, at 122, after a number of aircrafts leave the CDF or Stand, chemical recovery vehicles may need to be dispatched. Dispatching of chemical recovery vehicles, recording of recovered chemical and reporting are typically handled manually; where recording is using pen and paper, and dispatching is based on the CTM's knowledge and experience.

In order to ensure aircraft de-icing meets quality and safety standards, the CTM and contamination removal personnels typically have to go through extensive training and re-training. Tracking of the training levels of these personnel is usually recorded manually through paper-based record keeping.

As illustrated, conventional methods of coordinating de-icing of aircraft typically rely on radio communication and paper record keeping. Due to their nature, these techniques are prone to miscommunication, inaccuracies, error and inefficiency. As de-icing is part of the safety protocol for a flight, any miscommunication, inaccuracies and errors can become a safety concern.

Figure 2:
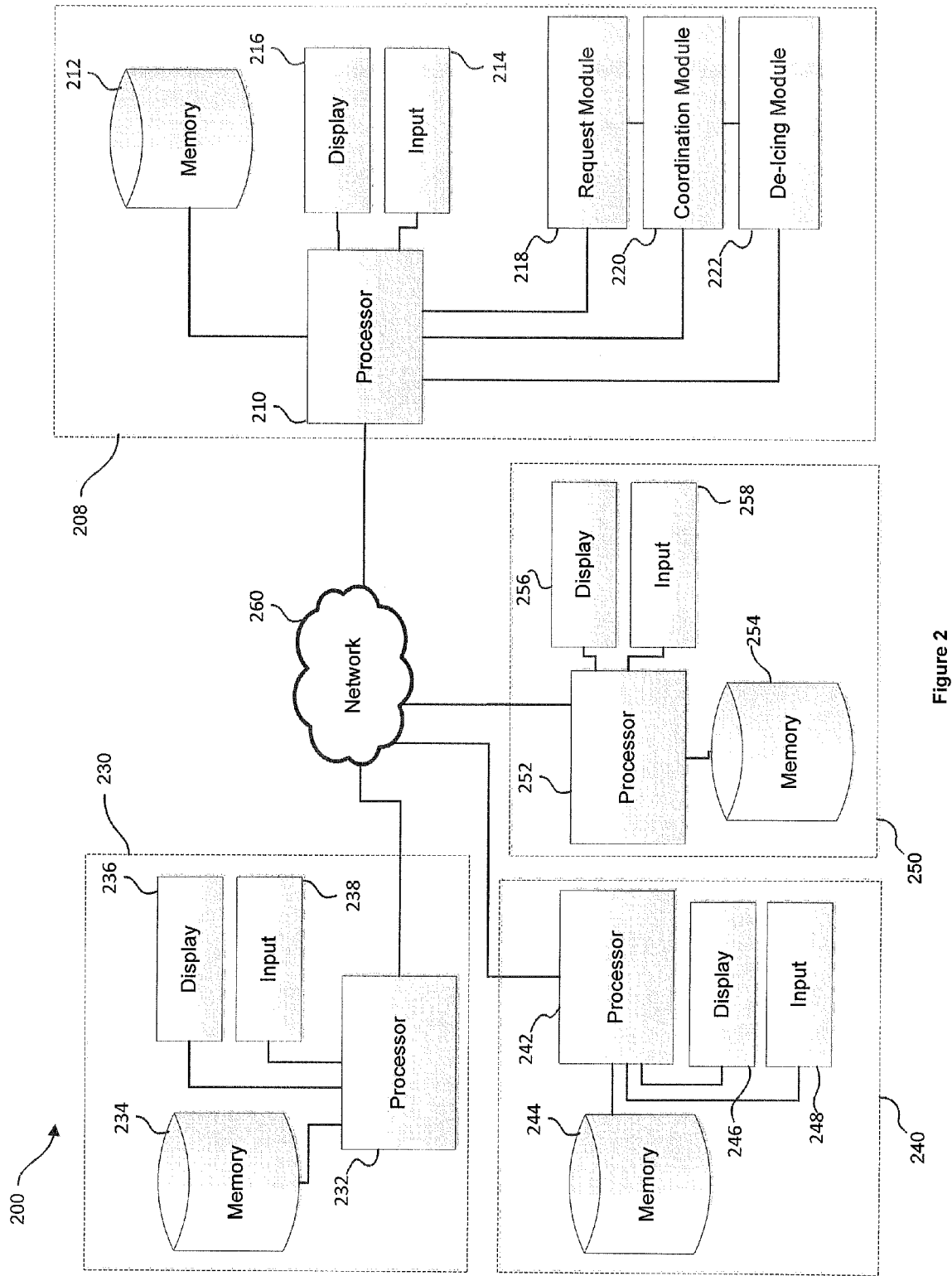
FIG. 2 illustrates an environment for a system for coordinating contamination removal from a surface of an aircraft according to an embodiment.

Turning to FIG. 2, an environment for a system for coordinating removal of contamination from a surface of an aircraft according to an embodiment is shown. The environment 200 includes a system 208 for coordinating contamination removal from a surface of an aircraft, a pilot device 230, a contamination removal device 240 and a CTM device 250. The system 208 includes a processor 210, memory 212, a display 216, an input 214, a request module 218, a coordination module 220 and a de-icing module 222. The pilot device 230 may include a processor 232, a memory 234, a display 236 and an input 238. The contamination removal device 240 may include a processor 242, a memory 244, a display 246 and an input 248. The CTM device 250 may include a processor 252, a memory 254, a display 256 and an input 258.

In another embodiment, the system may further include signaling devices, such as different lighting colours to be used to display contamination removal status updates and to assist in guiding aircraft to their correct locations for contamination removal treatment. For instance, an in-ground lighting system may help guide the aircraft to the correct bay or stand, define safe zones for the de-icing or contamination removal vehicles to be in when an aircraft is entering the area so that an aircraft does not hit a contamination removal vehicle. Also, an above ground lighting system may be used so people can see where they are and operate safely within the airport. Furthermore, road based lighting may be used for non-aircraft traffic control on the tarmac.

The system 208, the pilot device 230, the contamination removal device 240 and the CTM device 250 are preferably connected over a network 260 to send and receive data as required by the system 208. The network 260 may be, for example, the Internet, an Intranet, a Local Area Network (LAN), a Virtual Local Area Network (VLAN), a Personal Area Network (PAN), a cloud, a near field communication (NFC) network, and the like.

In further embodiments, the system 208, or elements of the system 208, may be executed on, or be components of, any of the pilot device 230, the contamination removal personnel device 240 or the CTM device 250. In some cases, the system 208, or elements of the system 208, may be executed on a server (not shown).

The system 208 includes at least one processor 210, configured to execute the instructions of the other modules. In some cases, each module may include a processor. In other cases, the system 208 may be a component within a server or network device, and the processor 210 may be a central processing unit for the server or network device. The system 208 can be operated using any suitable user device (not shown); for example, smart phones, tablets, laptops, netbooks, desktops, server stations and the like.

In an embodiment, the processor 210 may be configured to interact with memory 212. The memory 212 can be any electronic storage medium known in the art. In one case, the memory 212 may be a component of the processor or one of the modules. In a further case, the memory 212 may be an operable combination of two or more storage mediums. The memory 212 may be automatically managed, managed by one or more users, or managed by one or more administrators.

The display 216 may be provided on any device suitable for displaying data outputted by the processor; for example, a monitor, a touchscreen, a mobile device screen, a television or an electronic paper screen. The input 214 may be configured to monitor for a user input. The input may be received from any suitable input device, which may or may not be integrated with the display; for example, a touchscreen, a mouse, a track-pad, a keyboard, a game controller, a motion tracker, an optical sensor or a microphone.

Each device 230, 240 and 250 may similarly be operated using any suitable user device; for example, smart phones, tablets, laptops, netbooks, desktops, server stations and the like. Each device's memory 234, 244, 254 can be any electronic storage medium known in the art. As well, each device's display 236, 246, 256 may also be any device suitable for displaying data outputted by the processor; for example, a monitor, a touchscreen, a mobile device screen, a television or an electronic paper screen. Further, each device's input 238, 248, 258 may also be any suitable input device, which may or may not be combined with the display; for example, a touchscreen, a mouse, a track-pad, a keyboard, a game controller, a motion tracker, an optical sensor or a microphone.

The request module 218 is used for receiving requests from the pilot device 230 for contamination removal. In the request, the request module 218 may receive information about the aircraft including the aircraft's Civil ID, flight number, and International Civil Aviation Organization (ICAO) size. The aircraft information may also be retrieved from either the memory 212 or an external database.

To receive the request, the request module 218 may provide instructions to the pilot via the pilot device 230 by displaying a graphical representation of the aircraft to the pilot. The pilot can then input the desired de-icing treatment, fluid, and aircraft surface to be treated. The system 208 can have the pilot device 230 display the request and receive the requested input in various ways, including, but not limited to, displaying graphically as color changes on the image of the aircraft, as a text list of the input, as a table representing the possible input choices, and the like. The system 208 may allow the pilot to switch between the various ways of display and input. Having the pilot device 230 display exactly what is requested reduces the possibility for miscommunication of the contamination removal services required and will greatly reduce the amount of distracting radio chatter.

The coordination module 220 operates to maintain the communication between the various modules including presenting the pilot request to the CTM on the CTM device 240. The CTM can then review and enter the request into the system 208 as an order. In other cases, the order can be entered into the system 208 automatically. The pilot may then be directed to an ICP. When the pilot arrives at the ICP, the pilot device 230 may direct the pilot to contact the CTM on a specific radio frequency. The pilot device 230 may also instruct the pilot on where to stop within the bay, optionally using ground loops in the pavement to accurately stop the aircraft at the desired location or lighting warnings. In a further case, an electronic message board (EMB) (not shown) may be present at the ICP and connected to a network for identifying the flight number, directing the pilot to contact the CTM on a specific radio frequency and/or instructing the pilot where to stop.

Once the pilot has taxied and stopped at the desired location, the CTM, via the CTM device, may advise the pilot (via the pilot device) to contact the CTM when the brakes are set and the aircraft is configured for contamination removal. Additionally, the coordination module 220 may have the pilot input on the pilot device 230 that the instructions of the CTM are carried out. In one embodiment, the pilot device 230 includes a set of radio buttons allowing the pilot to signal that the brakes are set and that the aircraft is configured and set for contamination removal. The coordination module 220 may then send instruction to the CTM device 250 and the contamination removal device 240 to display this status indication. In this way, there is no miscommunication of the readiness of the aircraft for contamination removal. As well, the status indication may also be verbally communicated to the individual coordinating the contamination removal and the contamination removal personnel.

The de-icing module 222 has the contamination removal device 240 display the aircraft information. The aircraft information can be displayed in various ways, including: being displayed graphically as color changes on the image of the aircraft, as a text list, as a table, and the like. When the aircraft is ready, the contamination removal personnel "sign up" to treat the aircraft and notify the de-icing module 222 by inputting it on the contamination removal device 250. In this way, there is no miscommunication about what the contamination removal personnel have to treat and whether the contamination removal personnel are ready to do so. As well, the CTM does not have to assign the contamination removal to the aircraft as they sign on themselves.

Prior to signing up to treat the aircraft, the contamination removal personnel may sign in to the system 208. The contamination removal personnel may also input information about the vehicle they are using and the role they will be performing. In some cases, the coordination module 220 may be set up to only authorize contamination removal personnel for certain vehicles or certain treatment tasks based on their training and experience. As well, if the contamination removal personnel has not been pre-qualified for the specific vehicle, the coordination module 220 may not allow the contamination removal personnel to sign in to that vehicle.

As the contamination removal personnel progresses with de-icing the aircraft, the contamination removal personnel inputs into the contamination removal personnel device 240 each segment of the aircraft that has been completed, which is then communicated to the de-icing module 222. When each segment of the aircraft has been confirmed to be de-iced, the de-icing module 222 has the contamination removal personnel device 240 display that information; for example, by having a color removed from a graphical representation of the aircraft, or having a checkmark be placed next to that segment of the aircraft in a tabular representation. The de-icing module 222 may also have the pilot device 230 display this completeness information to the pilot. In a further case, this completeness information may also be displayed in messages on the EMB.

The de-icing module 222 may also collect data about the vehicles, contamination removal personnel crews and contamination removal chemicals. As an example, when the vehicle is filled up with de-icing chemical, the contamination removal personnel may input the amount of de-icing chemical in the vehicle to the coordination module 220 such as via the contamination removal personnel device 240. As the contamination treatment progresses, the contamination removal personnel may input into the contamination removal personnel device 240 an amount and type of de-icing chemicals that were used, which is then communicated to the de-icing module 222. In a further case, the automated vehicle vendor data systems may enter the de-icing data automatically. The CTM can monitor this information on the CTM device 250 for scheduling the crews for breaks and re-filling the de-icing chemical, without requiring additional radio communication.

When the contamination removal personnel has inputted that the contamination removal procedure is complete, the coordination module 220 may have the pilot device 230 display a message to the pilot indicating that the pilot should contact the CTM preferable using radio communication at a specific frequency. In a further case, the coordination module 220 may have an EMB change its display to display a message instructing the pilot to contact CTM at a specific frequency. The contamination removal personnel or individual coordinating the de-icing may also instruct the pilot over radio to contact CTM at a specific frequency.

The coordination module 220 automatically, or as inputted by the CTM in the CTM device 250, assigns the aircraft to proceed to an OCP by having the pilot device 230 display the OCP to the pilot (with possibly some holding locations along the way). Once the aircraft arrives at the OCP, the pilot may again contact the CTM. The CTM may then instruct the pilot to contact the Tower at which point the aircraft may leave the CDF or Stand.

Information regarding the aircraft and the contamination removal may be recorded by the modules 230, 240, and 250 into the memory 212. Stored information may include, but is not limited to, the type of contamination removal (de-icing or anti-icing, segments of aircraft treated, queuing time, holding time, staging time, aircraft configuration time, deicing time, anti-icing time, total bay time, total CDF time, aircraft identifying information, contamination removal personnel identifying information, and the like).

In a further embodiment, the de-icing module 222 may also track the type and total amount of chemical sprayed within a pre-determined area of the airport. This will allow the CTM, or other airport personnel, to set limits on the amount of fluid each area may contain before sending a chemical recovery vehicle. The level of chemical can be determined by a calculation of chemical sprayed, by sensors, or by input in the contamination removal personnel device 250. A warning level may be set by the CTM, or other airport personnel, to provide notification via the CTM device 250 or the contamination removal device 240 that the remaining volume of fluid is approaching a lower limit. In an example, the airport can be represented graphically with areas of the airport colored green when the level of chemical is above a re-fill level, yellow when the level of chemical is approaching the re-fill level and red when the level of chemical is lower that the re-fill level.

In some cases, where equipped with sensors, the de-icing module 222 can display the state of any drain/recovery valves to the devices. These drain/recovery valves are typically used to divert the flow of runoff from the surface to a storm sewer, sump, recovered glycol tank or other destination.

The chemical recovery vehicle may be dispatched to the area by a chemical dispatcher or by the CTM. The coordination module 220 may dispatch the person operating the chemical recovery vehicle by having the dispatch displayed on a dispatch device (not shown). The coordination module 220 may create an order which the crew of the chemical recovery vehicle may sign on to via inputting into the dispatch device. When the order is complete and the chemical has been collected, the crew of the chemical recovery vehicle may report the volume and concentration of the chemical collected, and close the order, via an input into the dispatch device. In some cases, the level of the recovered chemical in the appropriate tank, such as where directly piped from the pad to the tank, may be inputted by the crew of the chemical recovery vehicle into the dispatch device. The total recovered by vehicles, total piped to recovery tank, and the like, may be reported as the total chemical recovered. The coordination module 220 can use this information to produce reports comparing the total chemical sprayed against the total recovered, which may allow better management of the chemical inventory.

In another embodiment, a chemical inventory can be managed by the coordination module 220 through input(s) by contamination removal personnel into the contamination removal device 240 and the dispatch device. When delivery of chemical is received, the delivery can be inputted into the system 208 using the contamination removal personnel device 250 or the dispatch device. The waybill for the delivery may be inputted by being scanned. As well, the volume of chemical and quality tests performed on the delivered chemical, such as colour, contaminants, refractive index, and the like, may be inputted and tracked. Further, any spills or other miscellaneous loss of chemical may be inputted into the system 208. In this way, a complete and cohesive picture of the chemical inventory can be tracked; for example, what chemical is in each tank, how much is in each tank, what is the concentration in each tank, and the like. Weekly, monthly, and yearly testing of the chemicals can also be inputted for compliance to industry regulations set by the governing authority (FAA, Transport Canada, etc.). As well, the location of each valve, and a log of the valve position, and the person responsible for the valve change of state may also be inputted. Further, for forensic investigations into accidental discharges, and for other normal and abnormal chemical, such as glycol, handling processes, the chemical inventory can be used for reports and status display. This may also be achieved via another method or apparatus for recording chemical handling.

In a further embodiment, training of all contamination removal personnel can be tracked in the coordination module 220. In an example, standardized forms, sorted by employee, course, and instructor can be inputted by one of the devices 230, 240 and 250 and stored in the memory 212. Standardized check sheets which may be filled out at the time of training by the trainer and the trainee may be inputted. These forms may record training information; for example, what was covered in the course, who was the trainer, when did the training take place, if there is a change in the capabilities of the employee (are they ready to drive a new type of vehicle). In some cases, training questionnaires can be filled out by the trainee, inputted into the system 208 and graded by the coordination module 220. As well, the coordination module 220 may use fluid usage sprayed by a contamination removal personnel to compare the performance of the contamination removal personnel against known usage in similar conditions on similar sized aircraft. Usage totals falling outside the norm can be automatically flagged for possible teaching or corrective actions.

In another embodiment, other peripheral systems may transmit information to the apparatus for removal of contamination from the surface of an aircraft. For instance, a ground loop (or a set of sensors) may be integrated for determining the position of the aircraft so that the exact positions of aircraft are known, thereby possibly shortening the time needed for contamination removal vehicles to get into place to apply the contamination removal service or treatment. Also, the tank levels (amount of chemical remaining) may be transmitted to the system to better co-ordinate where aircraft should go for their contamination removal treatment so that aircraft are not sent to areas with low levels of contamination removal chemicals whereby a treatment may not be performed without a need to re-fill the chemicals. Also the system may benefit from input from meteorological systems which relate information such as, but not limited to, temperature, ice and snow conditions. Cameras may also transit information to provide information based on locations or actions of the CTM or contamination removal personnel.

Figure 3:
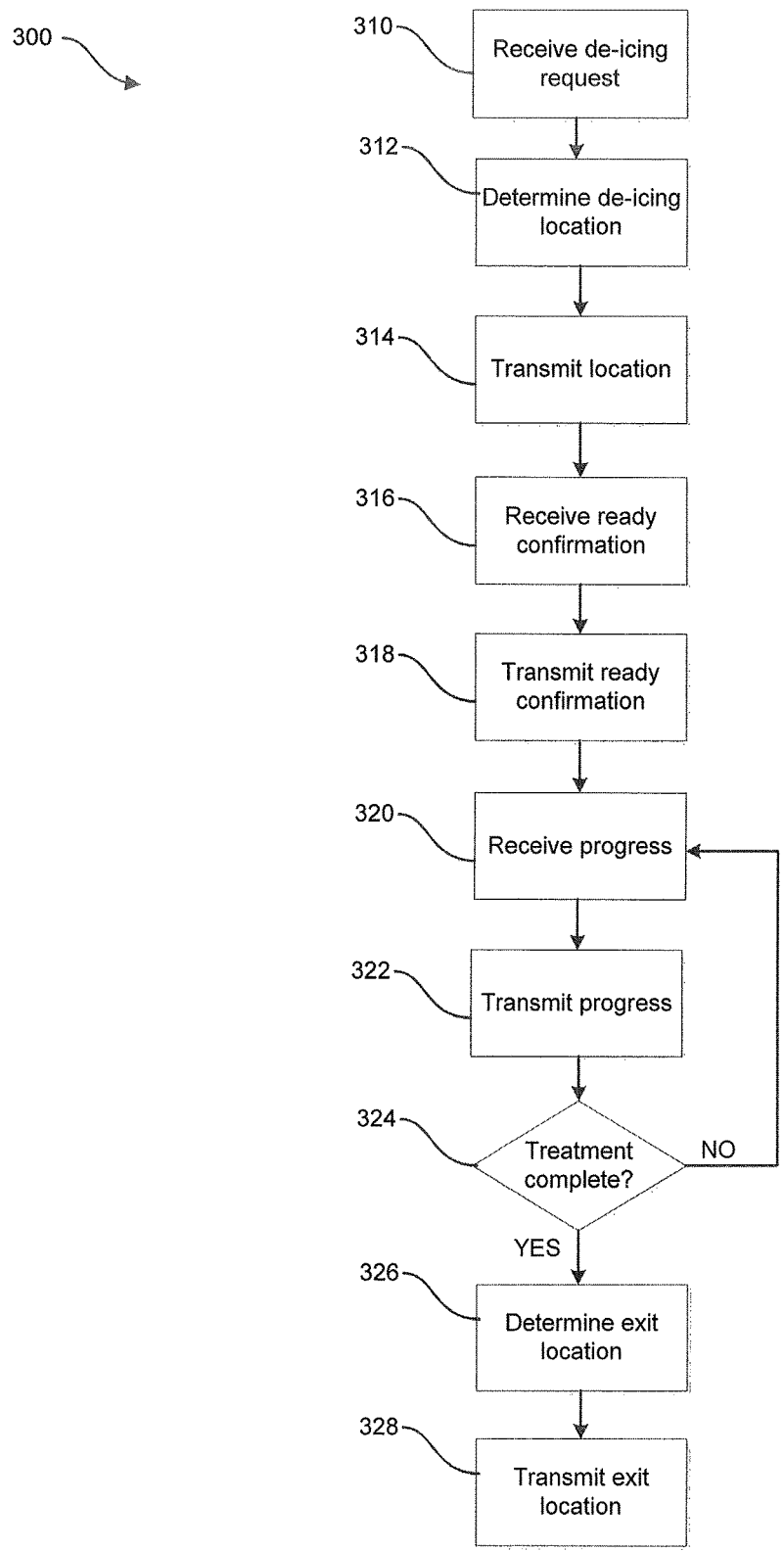
FIG. 3 illustrates a flowchart for a method for coordinating contamination removal from a surface of an aircraft according to an embodiment.

Turning to FIG. 3, a flowchart for a method 300 for managing contamination removal from a surface of an aircraft, according to an embodiment, is shown. More specifically, the embodiment is directed to the field of de-icing, however, it will be understood that the method may also be used for other contamination removal operations such as, but not limited to anti-icing.

At 310, a request for contamination removal is provided from the pilot via the pilot device 230 and received at the request module. In one embodiment, the pilot may press a button to transmit an alert or request to the request module 218. The request is then reviewed by the system 208 or by an individual monitoring the system such as the CTM. Upon review, the request may be confirmed by the CTM on the CTM device 240, or the request may be confirmed automatically. Once confirmed, the request may be entered as an order. In some cases, after the request is confirmed, the pilot can enter the estimated pushback time (or departure time) to allow for better coordination of the scheduling and location within the airport for the contamination removal treatment.

Figure 4:
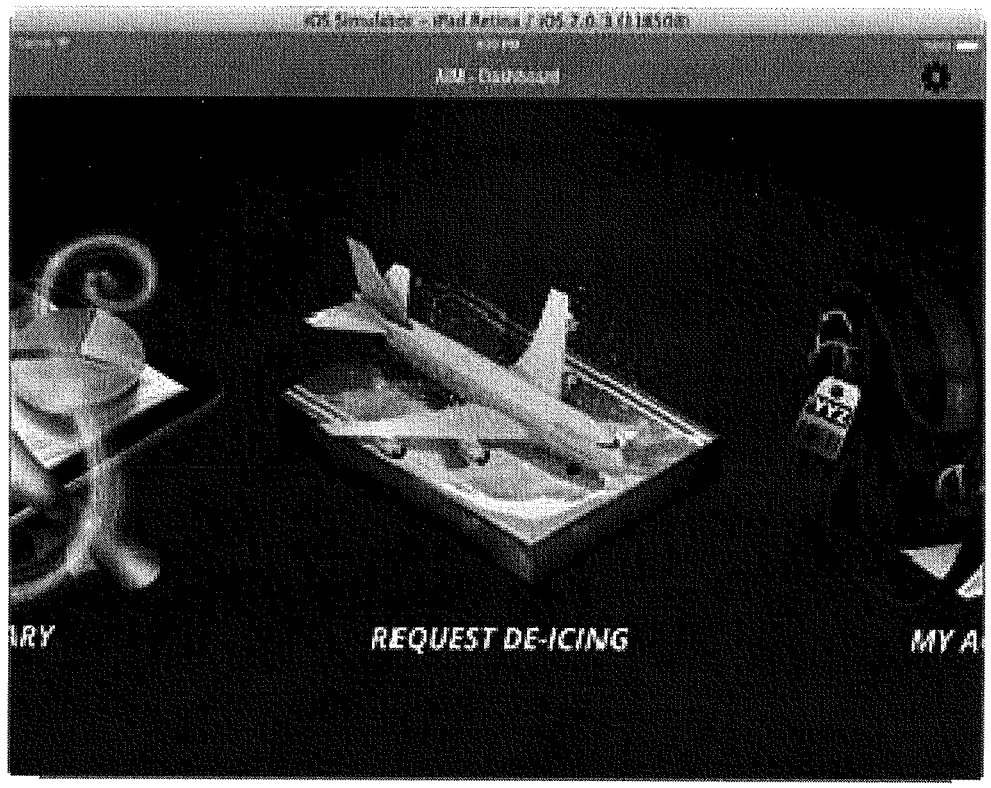
FIG. 4 is an example screenshot of a contamination removal icon.
Figure 5:
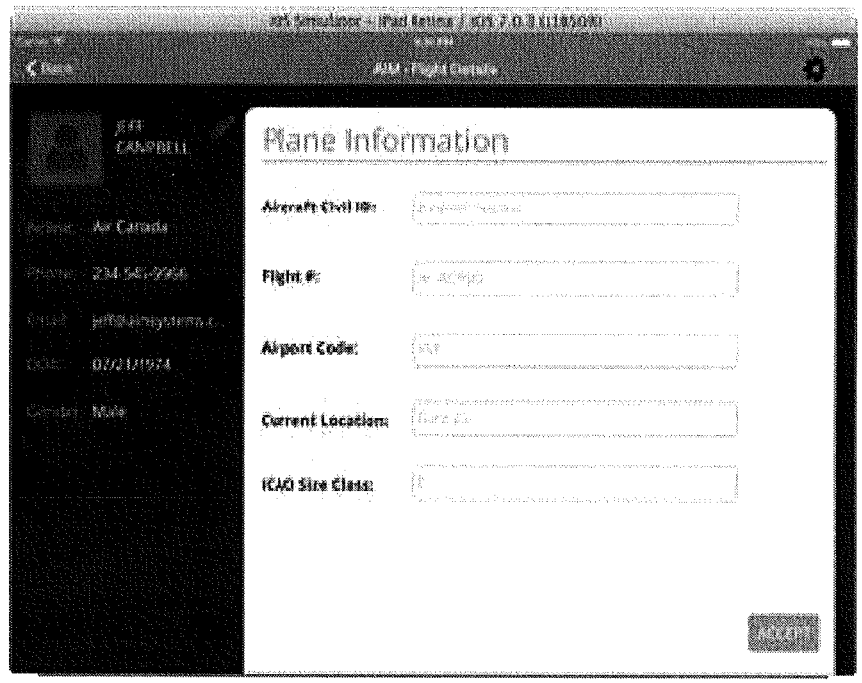
FIG. 5 is an example screenshot of a contamination removal aircraft information form.
Figure 6A:
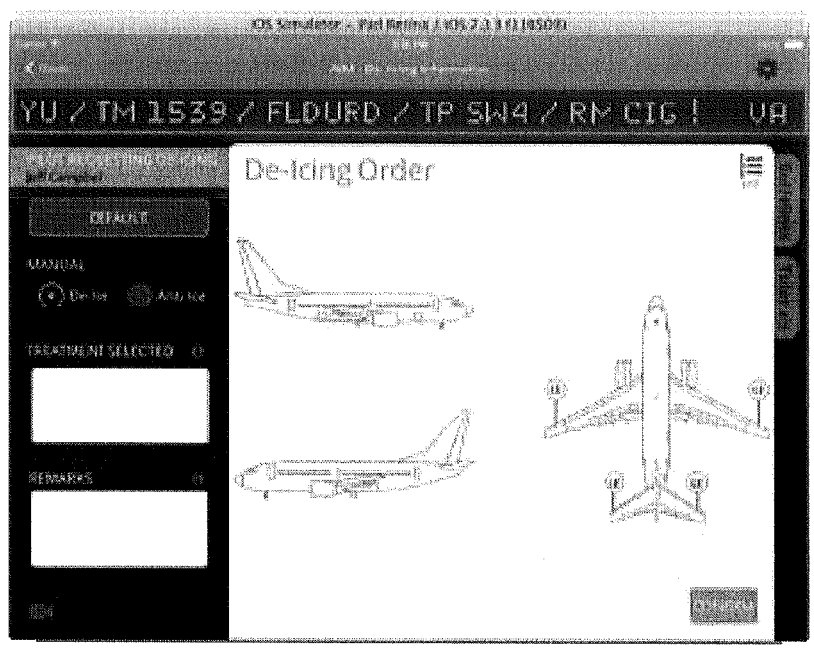
FIG. 6A is an example screenshot of a graphical representation of contamination removal selection.
Figure 6B:
FIG. 6B is an example screenshot of a graphical representation of contamination removal selection with aircraft segments selected.

FIGS. 4 to 8 are various exemplary screenshots of the pilot device which may be used to assist the pilot in making the contamination removal treatment request. As shown in FIG. 4, the pilot may select a Request de-icing Icon from a menu displayed on the pilot device 230. Further, as shown in FIG. 5, as part of the request, the pilot may enter aircraft information such as the make and model, the Civil ID, the flight number, and the ICAO size class. Further, as shown in the FIGS. 6A and 6B, the pilot can enter the surfaces and segments of the aircraft that are required to be treated. In this example, a graphical representation of the appropriate aircraft is displayed on the pilot device 230. The pilot can also select the segment of the aircraft to be treated and the type of treatment, de-ice, anti-ice, or both. As the segments are selected, in a preferred embodiment, the area will turn a different color (or be shaded), as seen in FIG. 6B. In some cases, a list of the selected segments may be displayed in a text box. Having the request displayed in two places will allow unambiguous communication of what is selected for treatment. In addition, there may be a text box input where the pilot may make special requests. In some cases, where the aircraft's location is equipped with cameras, the pilot may be presented with an outside view of the aircraft during selection and during any of the treatment. In a further case, the pilot may be presented with a ticker across the display to provide live information about de-icing, such as the throughput at the CDF, weather information, and the like.

Figure 7:
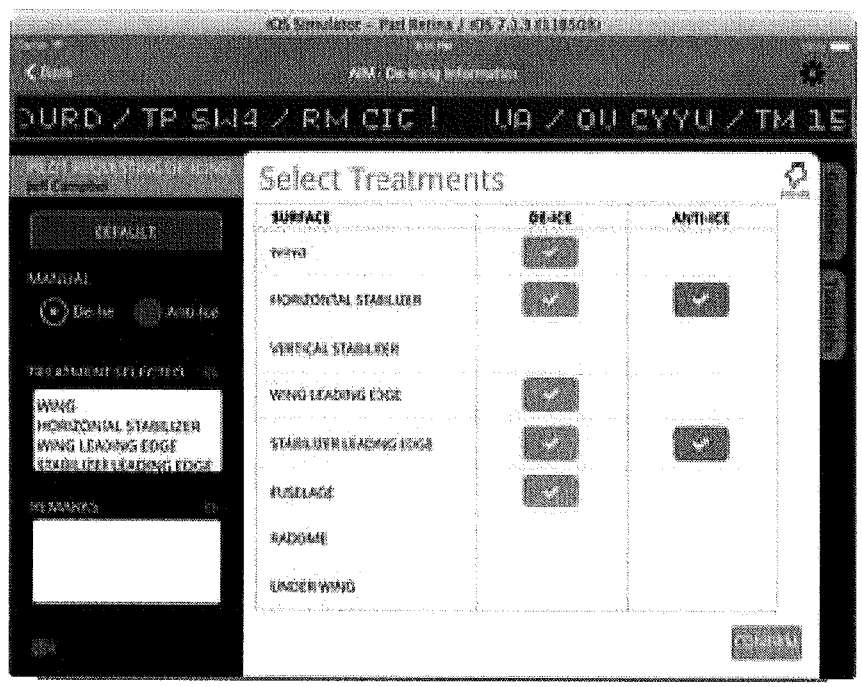
FIG. 7 is an example screenshot of a list representation of contamination removal selection.
Figure 8:
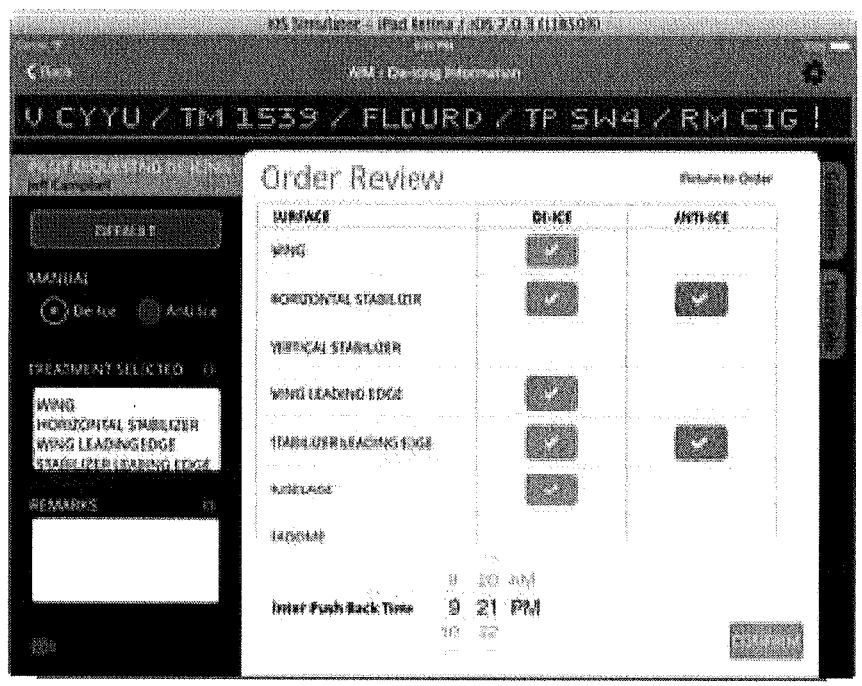
FIG. 8 is an example screenshot of a list representation of contamination removal selection with a push back time form.

In some cases, as shown in FIG. 7, the pilot may be also given the option to select aircraft segments to be treated and the treatment type via a list. The list may allow for the selection of the segments and surfaces, and treatment type, from a table. The list may be organized such that smaller or less commonly treated surfaces may be located further down on the list. The list may also be specified by a customer or developed from a list of default or standard treatments, alone or in combination whereby a pilot, or any individual, may select a treatment via a single pushbutton. As shown in FIG. 8, the pilot can also enter the estimated pushback time where appropriate.

At 312, the request module 218 determines the de-icing location by selecting an ICP and the Bay, or by selecting a Stand or Gate. This is preferably performed by a search of currently used contamination removal locations to determine if there are any empty locations for the aircraft to receive the treatment (and whereby the de-icing chemical is above the re-fill level). After making the determination of an open location which meet the required criteria, this information is transmitted to the coordination module. At 314, the coordination module 220 transmits the de-icing location to the pilot device 230 (although this may also be performed by the request module). The pilot device 230 displays this to the pilot such that the pilot can then taxi to the appropriate de-icing or contamination removal location.

Once at the de-icing location, the pilot is prompted to indicate when the brakes are set and the aircraft is configured for de-icing before the contamination removal treatment can begin. At 316, the coordination module 220 receives confirmation from the pilot device 230 that the brakes are set and that the aircraft is configured for contamination removal.

Figure 9:
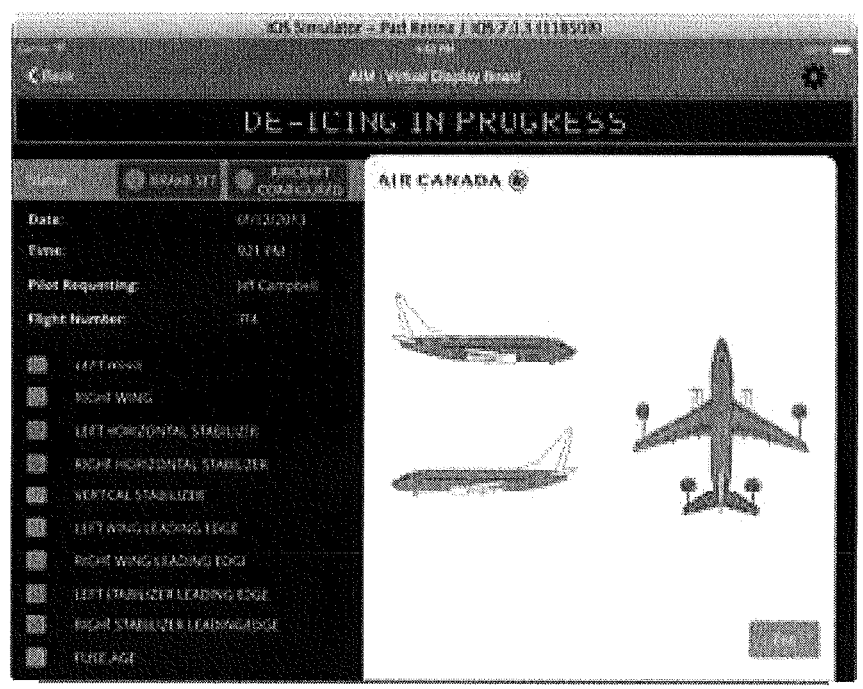
FIG. 9 is an example screenshot of a graphical representation of contamination removal progress.

As an example, as shown in FIG. 9, the pilot may have to select a 'Brake Set' and/or 'Aircraft Configured' radio buttons to confirm the brakes are set and the aircraft is ready for de-icing.

At 318, the ready confirmation is transmitted to the contamination removal device 240, the CTM device 250, or both. Unlike with solely verbal communication, this allows for confirmation directly to the contamination removal personnel and CTM that the aircraft is ready for de-icing.

Since the aircraft is confirmed ready, contamination removal may commence. At 320, during contamination removal, the de-icing module 222 may receive progress reports of the on-going treatment. The progress report may include, for example, the percentage completed, the surfaces or segments completed, the type of treatments completed, any difficulties experienced, any delays expected, and the like. At 322, the de-icing module 222 may transmit the progress report to the pilot device 230, the CTM device 250, or both.

Figure 10:
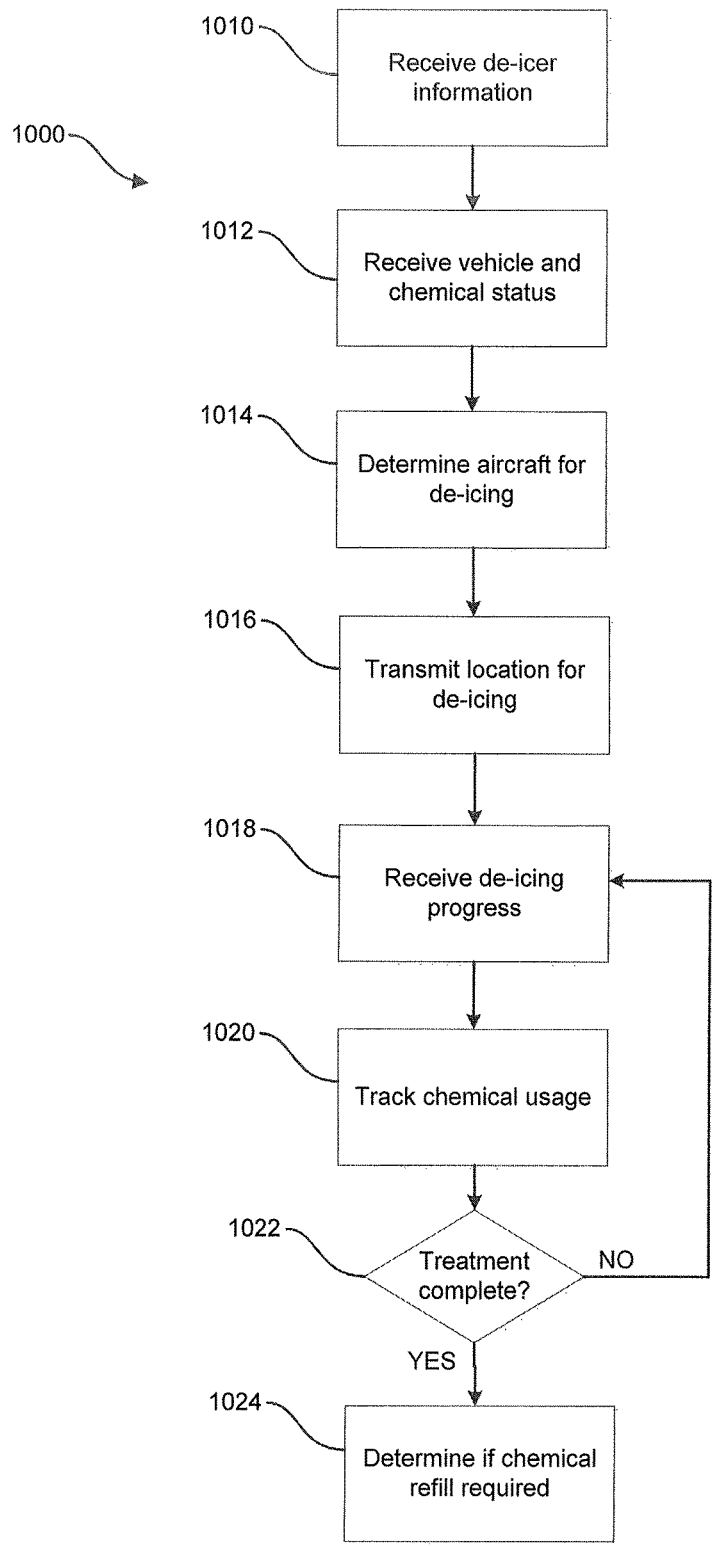
FIG. 10 illustrates a flowchart for a method for coordinating contamination removal personnel for contamination removal from a surface of an aircraft according to a further embodiment.

As an example, as shown in FIG. 10, as the de-icing module 222 receives progress reports, the de-icing module 222 may send instructions to the pilot device 230 and CTM device 250 to display de-icing completion of segments of the aircraft by having the segments change color or shading. As well, the completed segments can be added to a text box on the display. This may allow the pilot and CTM to monitor the progress of the contamination removal treatment process in real-time. In some cases, while the de-icing is in progress, a live ticker may display the de-icing progress information. As the pilot is apprised of the progress of the de-icing, this progress report may be used as a positive hold, reducing or removing the requirement for vehicles or lights.

At 324, the de-icing module 222 may determine from the progress report or reports whether the contamination removal treatment is complete. If it is not complete, at 320, the de-icing module 222 will continue receiving, monitoring and reviewing progress reports. If de-icing is complete, at 326, the coordination module 220 may determine the OCP exit location. At 328, the coordination module 220 may transmit information relating to the OCP exit location to the pilot device 230 for display to the pilot.

Turning to FIG. 10, a flowchart for a method 1000 for managing contamination removal personnel for contamination removal from a surface of an aircraft is shown.

Figure 11:
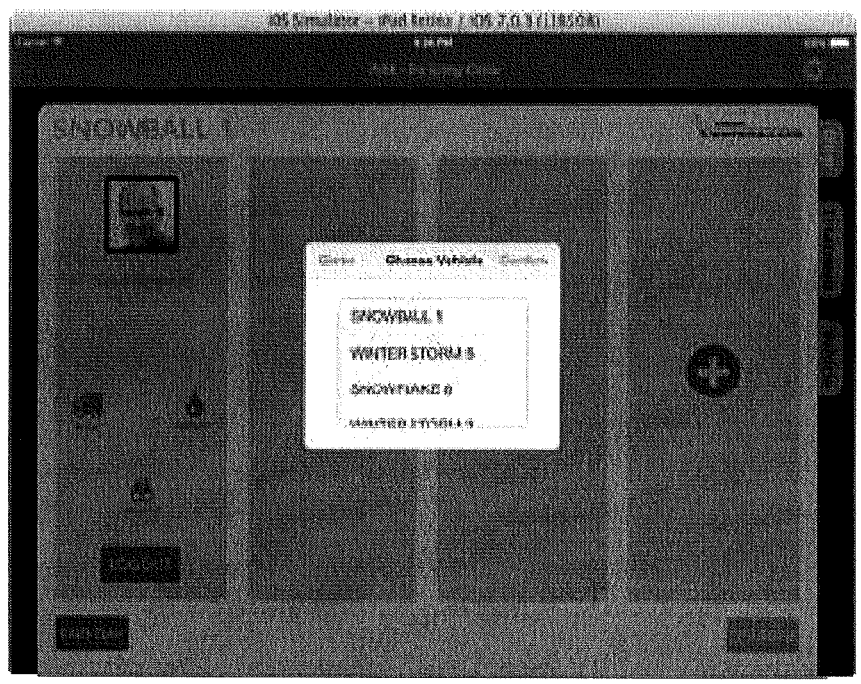
FIG. 11 is an example screenshot of a contamination removal vehicle selection.

At 1010, the coordination module 220 receives identifying information from the contamination removal personnel device 240 about the vehicle associated with the contamination removal personnel. The coordination module 220 may also receive information regarding the role the contamination removal personnel is performing, such as, driver, sprayer, observer, and the like. As an example, the contamination removal personnel may input the information in the form shown in FIG. 11.

Figure 12:
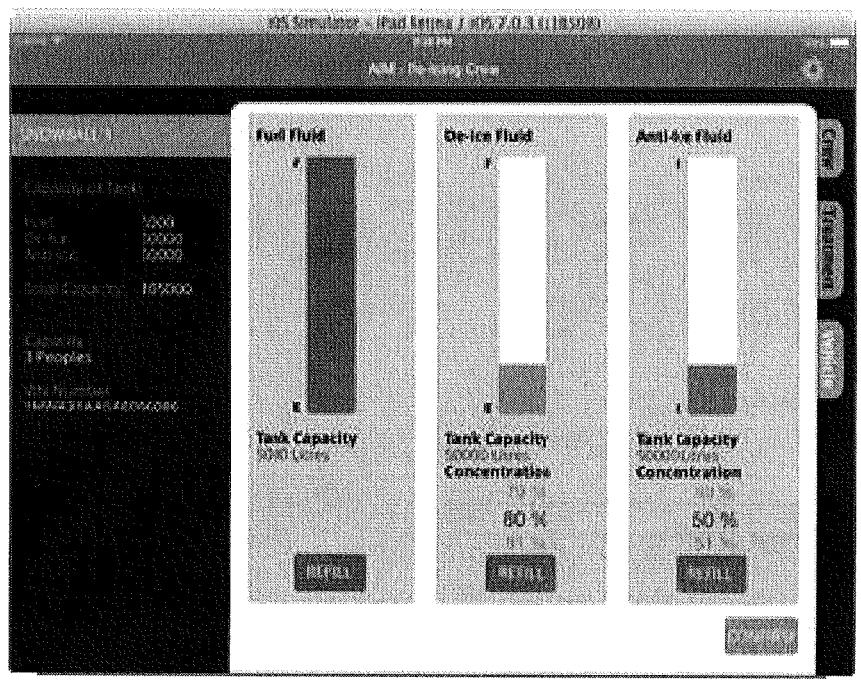
FIG. 12 is an example screenshot of a contamination removal vehicle fuel and chemical input.

At 1012, the de-icing module 222 receives information regarding the status of the vehicle and chemicals from the contamination removal device 250; for example, the amount of fuel and the volume of de-icing chemical remaining. As an example, the contamination removal personnel may input this information in the form shown in FIG. 12. In addition, the names and roles of people involved with the aircraft such as engineers, flight crew, baggage handlers and the like may be displayed so that responsibility may be determined and stored for training logs.

At 1014, the coordination module 220 determines which aircraft the contamination removal personnel should provide the contamination removal treatment to based on criteria such as, but not limited to, availability, amount of fuel, amount of contamination removal chemicals and location. At 1016, the coordination module 220 transmits the location of the aircraft to be treated and the treatment to be provided to the contamination removal device 250 so that the contamination removal personnel can see what the task is.

At 1018, the de-icing module 222 receives progress of the contamination removal progress for the contamination removal device 250. At 1020, the coordination module 220 tracks the amount of chemical used from the received progress report. At 1022, the de-icing module 222 determines if the de-icing treatment is complete from the progress report. If the treatment is not complete, at 1018, the de-icing module 222 continues receiving de-icing progress reports. If the de-icing treatment is complete, at 1024, the co-ordination module 220 determines the amount of chemical remaining in the vehicle. If the amount of chemical remaining is not sufficient, the contamination removal personnel may be told to refill the vehicle with the required chemical(s) or fuel. If there is sufficient chemical remaining, the contamination removal personnel may be assigned to its next aircraft treatment assignment.

Figure 13:
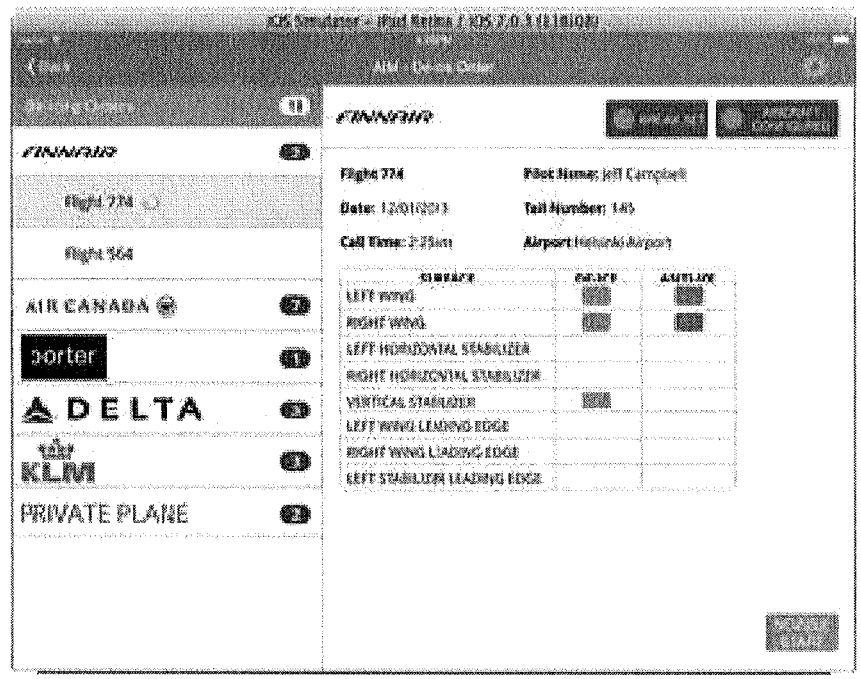
FIG. 13 is an example screenshot of a contamination removal order.
Figure 14:
FIG. 14 is an example screenshot of a graphical representation of contamination removal completion and progress.
Figure 15:
FIG. 15 is an example screenshot of a list representation of contamination removal completion and progress.

As an example, as shown in FIG. 13, the treatment requested by the pilot in a contamination removal order can be displayed to the contamination removal personnel through the contamination removal device 240. As shown in FIG. 14, the segments of the aircraft requested by the pilot (or CTM) for treatment may appear colored on the screen and may also appear in a text box, thereby reducing the possibility of miscommunication. As the segments or surfaces of the aircraft are completed, the contamination removal personnel may select the surfaces of the graphical representation of the aircraft, as shown in FIG. 14, which may then have a further coloring scheme. As well, as shown in FIG. 15, the contamination removal personnel may select completion of segments of the aircraft from a list.

Figure 16:
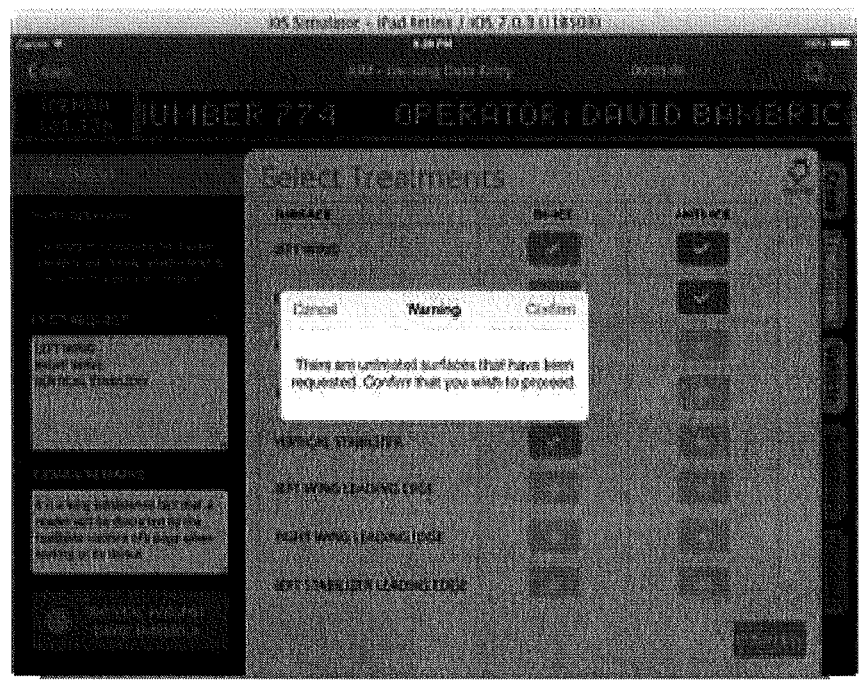
FIG. 16 is an example screenshot of a contamination removal completion warning message.
Figure 17:
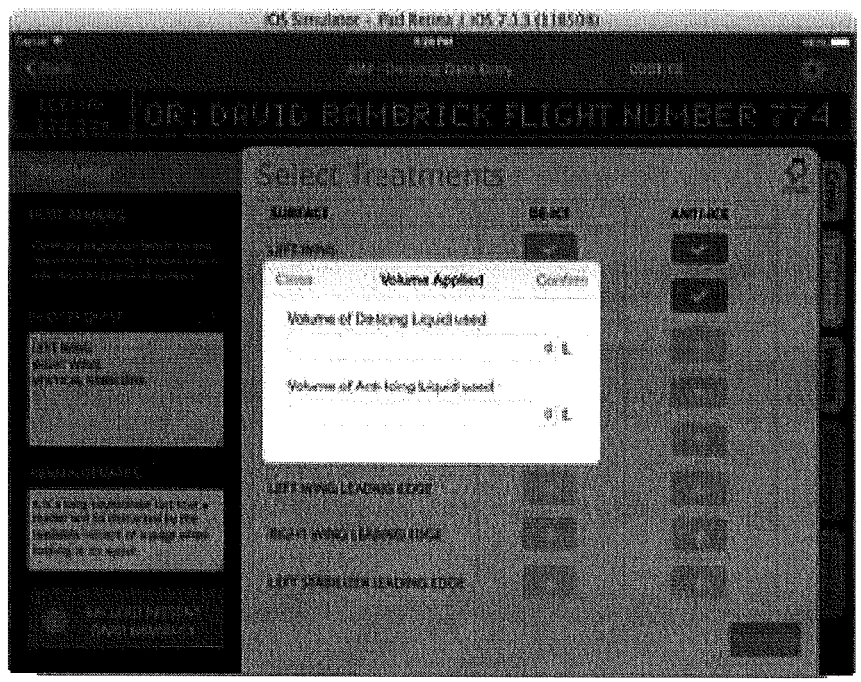
FIG. 17 is an example screenshot of an input of remaining fuel and chemical.

In this example, as shown in FIG. 16, when the contamination removal personnel tries to input into the contamination removal device 240 surfaces that have been treated, when there are selected segments of the aircraft not yet treated, the contamination removal device 240 may display a message warning the contamination removal personnel. When the contamination removal is complete, the contamination removal personnel may be prompted to input the amount of chemical and the type of chemical used in the contamination removal treatment. This may be recorded and saved for verification, reporting and further scheduling.

Figure 18:
FIG. 18 is an example screenshot of multiple contamination removal status.

In some cases, as shown in FIG. 18, the status of de-icing vehicles and the chemical quantities on board can be displayed to the CTM, a Bay manager, or any other supervisor or personnel. That person may enter or override the information where a contamination removal personnel is not equipped with contamination removal device 240, if an incorrect value was entered, or where other circumstances dictate. In some cases, this may also be used by that person to confirm approval of a treatment or supervise competition in order to provide an extra layer of oversight.

Figure 19:
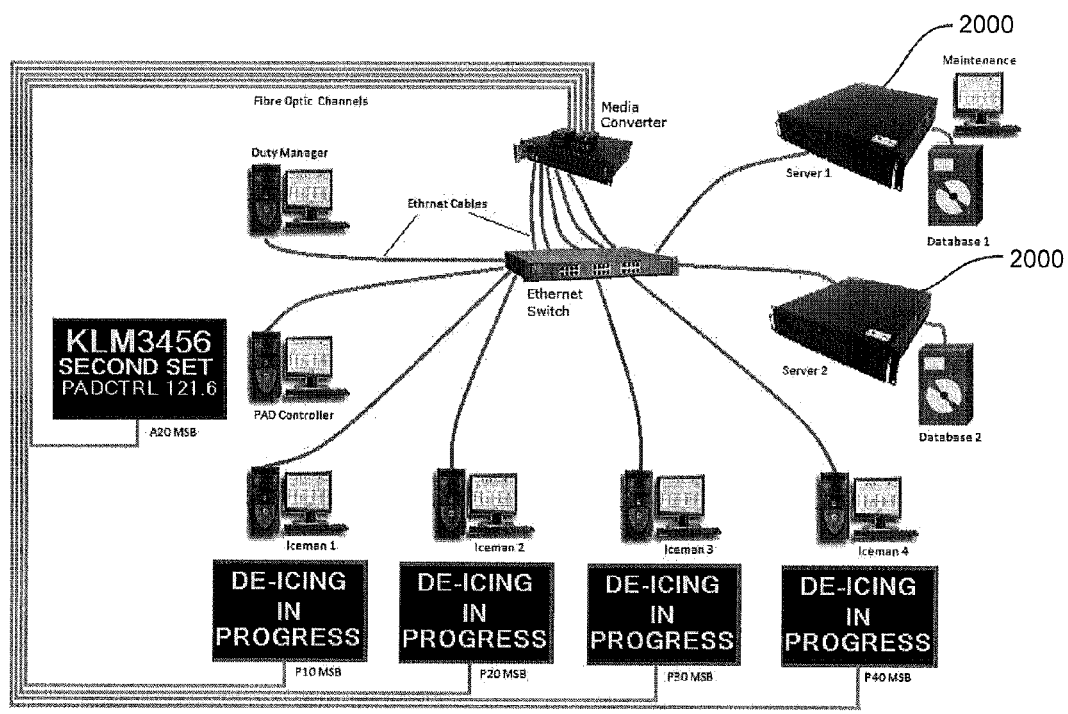
FIG. 19 is schematic diagram of apparatus for coordinating removal of contamination from the surface of an aircraft.

Another embodiment of an apparatus for coordinating removal of contamination from surface of an aircraft is shown in FIG. 19.

Turning to FIG. 19, a schematic diagram of apparatus for coordinating removal of contamination from the surface of an aircraft is shown. The apparatus includes any number of electronic message boards (EMBs) located within the airfield, a set of contamination removal boards, a set of Queuing boards, a set of Directory Boards and a set of Gate Direction Boards (although not all are shown in FIG. 19). The system may also include a set of redundant servers for controlling the messages on the various boards. The operators and maintenance staff use Client applications stored within individual handheld electronic devices to manually trigger EMB messages.

In the current embodiment, the system is centred about the two servers 2000, seen as EMBDriver servers which are in regular communication with the EMBs to transmit messages for display on the EMBs. In the preferred embodiment, only one of the servers is the "Active" server and the other server is designated as the "InActive" server. The Active server is the machine controlling the messages on the EMBs. The servers monitor each other for activity, and the InActive server will become the Active server in the event a loss of communication between the Active server and the EMBs.

As each contamination removal treatment is completed, the final electronic flight strip is saved to the reports databases (again in two different locations for redundancy). The production interfaces for the system are preferably thin client front ends to the servers or databases associated with the servers and run on varying devices including smart phones, tablets (wirelessly enabled on 4G network, or local wireless LAN), and PC's (laptop or desktop), located in the contamination removal vehicles, the aircraft or at the gate.

The system may further include contamination removal operations central control room (or CTM). A CTM interface allows a user to select the default treatment type, and if equipped, the default EMB intensity, and ground light intensity for displaying a message regarding the contamination removal treatment on the EMB. The user may also assign the contamination removal vehicles to the various locations through-out the airport, and if existing the Central De-Icing Facility (CDF). The CTM system shows an overview of the entire de-icing facility, and the real time display of all of the supplied EMB's will be shown on the screen in real time. The pad controller has an overview screen showing the entire airport, and also one for the CDF. On the CDF display, the system displays the position of the aircraft, and the actual real-time messages on each supplied EMB. As a contamination removal request comes in, such as over the radio or via a Pilot interface, the request is acknowledged and contamination removal treatment confirmed. When the aircraft reaches the treatment location, the pilot will be notified of the bay or stand within which they will receive treatment. This information may be displayed on one of the EMBs. Once the treatment bay is assigned, the contamination removal personnel may then perform the treatment. Regular progress updates displayed on a EMB for the pilot to see.

Within a control room, (if one exists), the actual request for contamination removal issued is received by a control room controller. The control room controller acknowledges the request and confirms the contamination removal treatment requested and then assigns the contamination removal vehicles to the location and tasks and then monitors the treatment and reflects the progress by accessing the system which they allows the CTM to determine the disposition of the aircraft and the real time status of all EMB's. If the control room does not exist, these communications will be performed by users accessing interfaces associated with individual contamination removal vehicles.

The client applications allow individuals to manually assign aircraft to various locations within the contamination removal facility, and change the "State" of the aircraft within the system. The current state of the aircraft at any location in the contamination removal system is held in a table in a central database. In addition, where available, the system may be connected to outside data sources which could automatically fill in the table with information, automatically changing the "State" of the aircraft and triggering appropriate messages. These outside applications could "Push" data into the local database using the WebServices, or be "Pulled" in from the EMBDriver application (reading other datasources on an exception or timed basis). Each operator action or data change from an outside source is communicated to the central servers changing the State of the aircraft. The Active Server monitors the state and changes the messages on the signs accordingly.

Web services connect the client applications and other outside data sources with the local database such that each time data is written to the database, it is written to both redundant server databases keeping them current. All data read from the database is read from the "Active" server. In one embodiment, the servers monitor each other through the use of a watchdog entry on a server status database table. Each server increments a watchdog value in the database on the other server's database. In the event of a loss of communication or the interruption of the EMBDriver program, the watchdog value stops changing. The remaining server either continues to be the "Active" server, and marks the other server as communications failed, or becomes the "Active" server and begins to send messages to the EMB's.

Restoration of the failed server requires the intervention of maintenance personnel to initiate as each EMB contains two controller boards, a Master and a Slave. The Slave board in the default controller, if at any time the Slave fails to respond the Master assumes control. The state of the boards is stored in the database as it changes.

In operation, multiple modules and tables are required for operation of the method for managing contamination removal.

Lighting and Other Database Tables

There are four main operational tables in the database, the PadStatus Table, which holds all of the state information for each location and EMB; the Events Table; the Message Table and the Alarm Table, which are used by all of the Client and EMBDriver applications. In addition to these tables there is an intermediate table EMBCommands which is used to hold commands from the Maintenance Client and pass them on to the EMBDriver. Finally each Client Application has a table which holds configuration data specific to that client.

PadStatus Table

The PadStatus Table is the central table for providing information and status of all of the components of the contamination removal control system.

Each physical or functional location has an assigned row in the Table which keeps track of the "State" of the location. Typical locations for a contamination removal application are shown below.

| De-Icing Pad | Assigned to Pad | Hold Abeam | Queue position | Duty Manager |
|---|---|---|---|---|
| P10-10 | P10-110 | P10-210 | A20-320 | 600 |
| P12-12 | P12-112 | P12-212 | A19-319 | |
| P14-14 | P14-114 | P14-214 | A18-318 | |
| P16-16 | P16-116 | P16-216 | A17-319 | |

For example: The P10 De-Icing Pad has a row assigned to it which contains the state of the system—Message State 3="", the current message being sent to the EMB, the status of the EMB controllers, the mode of the software (Auto/Manual).

There are special states unrelated to the messages being displayed on the signs such as Maintenance Mode (out of service due to maintenance), or Duty Manager Mode (out of service set by the Duty Manager), System Off (as set by maintenance).

Events Table

Stores all events which are operator triggered, system triggered or externally triggered.

Message Table

Stores the format of the messages with placeholders for the variable information, holds the starting position, colour, and other information related to the messages. The placeholders are replaced by the live data either entered by the Operator, or from outside datasources.

Alarm Table

Holds the state of the Current Alarms in the system.

Configuration Tables

All of the client applications read configuration information from the database, button locations, text, airport information etc in order to dynamically configure the system for each application and client.

The EMB driver application also reads configuration data from the database, including information on each sign (location, address, size, name), and information required to allow it to connect to other data sources for "Pulling" information in.

For co-ordinating the EMBs, a flexible database is used to interact with current systems such as, but not limited to, Multilateration Radar systems, GPS systems, laser ranging systems, ultrasonic ranging systems, electronic ground loops, load sensors. Communication is preferably handled using standard protocols, such as, but not limited to ODBC, OPC (OLE for Process Control), ModBus, HTML/XML and SOAP Messaging, TCP/IP Sockets, MSSQL, Oracle SQL, RS232/RS422 Serial Connections or hardwired on/off and analog signals These connections can be used to update the location of the aircraft in the database, triggering appropriate messages for the co-ordination of Traffic Flow, Anti-Incursion, Personnel and Asset Protection, De-Icing treatment, Docking and other airfield related services.

The messages stored in the database can be merged with variable information, including but not limited to the aircraft location, flight designation, meteorological information, time, treatment steps, directions, Radio Contact frequencies and others to allow for meaningful and timely non-radio based visual communication with pilots, aircrew, ground crews and other airport and airline personnel.

Figure 20:
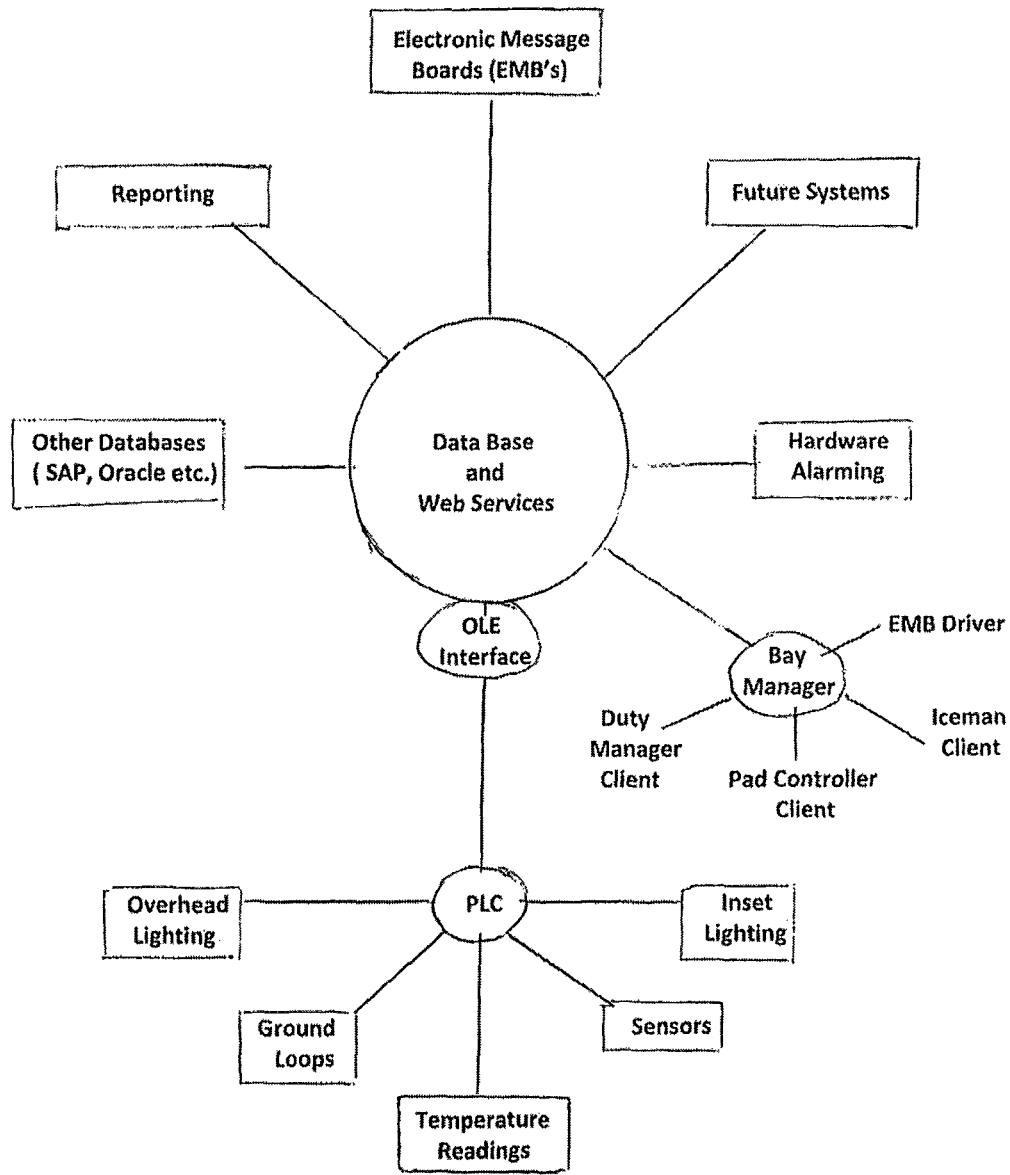
FIG. 20 is a schematic diagram of an entire aircraft control system.

FIG. 20 is a schematic diagram of an entire aircraft control system.

In an alternative embodiment, a web camera interface may be installed on each contamination removal vehicle, and take "snapshots" of the de-icing tank level meters from the truck gauges—the liquid values will be read via an OCR (optical character recognition system), and translated into numerical values. In another embodiment, a voice activated interface will allow the values of the de-icing level to be stored into the application whereby the values will be transmitted to the pad controller and the user associated with the pad controller prompted for confirmation.

More specifically, for the Electromechanical Meter Reading Recognition and Recording, using an image of an existing elect mechanical meter, or other display the system reads specific sections of the image and automatically populates our back end database to record the values. The image creation will be triggered a specific points in the de-icing or other tasks. The database will record the actual image and then using the task and our OCR software enter the alpha numerical value(s) into the database (as well as the actual picture should there be a need to go back and correct the OCR entries), in addition should the image be taken using a GPS enabled device, the location of the device at that time will be recorded into the database.

More specifically, for the Voice Recognition for DTS from Remote Stations and Vehicles (Data Transmission and Storage), at specific points in their tasks, using a mobile device as a microphone to our system, or streaming voice to our server, or using a standard microphone, the operator will be able to speak the data values displayed on the existing electromechanical meters or other displays into our system. The system will then capture the number, along with the actual voice message (for correction should it be necessary), and enter it into our database.

Figure 21:
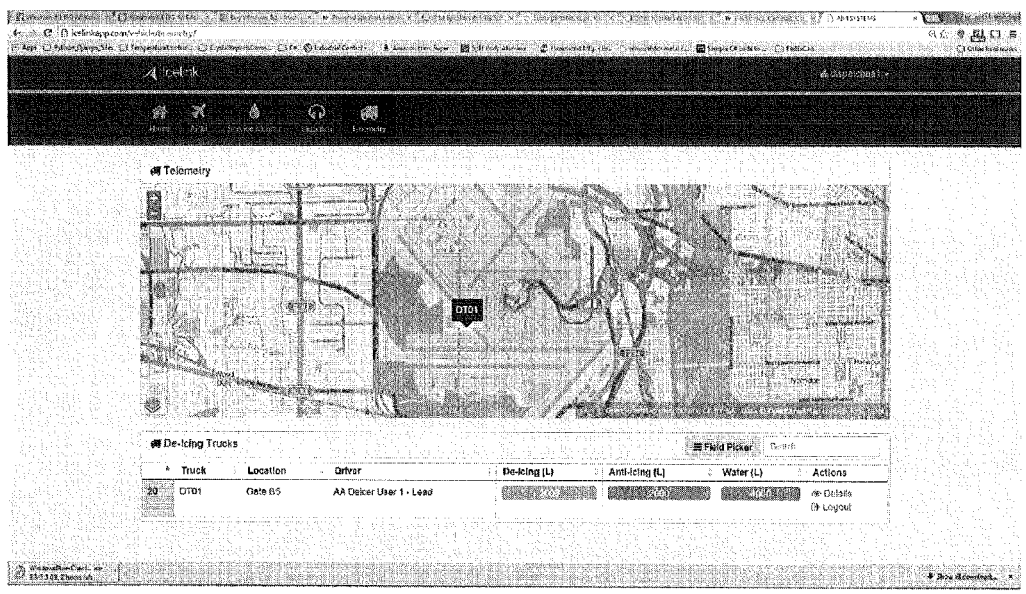
FIG. 21 is an example screenshot of a telemetry module.

Turning to FIG. 21, an example screenshot of a dispatch telemetry module is shown. The screenshot shows an example of the telemetry screen available within a dispatch application. The de-icing fluid volumes entered by contamination removal personnel allow an individual looking at the dispatch application to track fluid usage in real time. The Table in the screenshot of FIG. 21 shows bar graphs for each truck, for each of the de-icing and anti-icing fluids and blending water (whereby, in the current embodiment, the numerical value is superimposed atop the bar graphs for clarity). In one embodiment, the information provided by the example screenshot allows an individual to advise the truck drivers when they are running low, or when they still have sufficient fluid for contamination removal.

Because the system tracks the values entered manually by the contamination removal personnel, the system may mimic a more expensive completely automated Data Transfer System (DTS). The system is also designed to be able to interface with these completely automated DTS systems (where they exist), allowing hybrid fleets of trucks to be represented, monitored, and tracked in the same manner.

Furthermore, the screenshot may provide for asset tracking (the tracking of equipment being used in the contamination removal process. Each contamination removal vehicle may be equipped with tracking apparatus, such as, but not limited to, an iPad, so that its position may be displayed in real-time. As an example, as shown in the Geospatial view of FIG. 21, the location of one vehicle, listed as DT001, is shown, allowing a dispatch user to better manage the assets, assigning vehicles to the closest aircraft in need of contamination removal, assisting in the management of breaks, fill-ups and vehicle availability as well.

Figure 22:
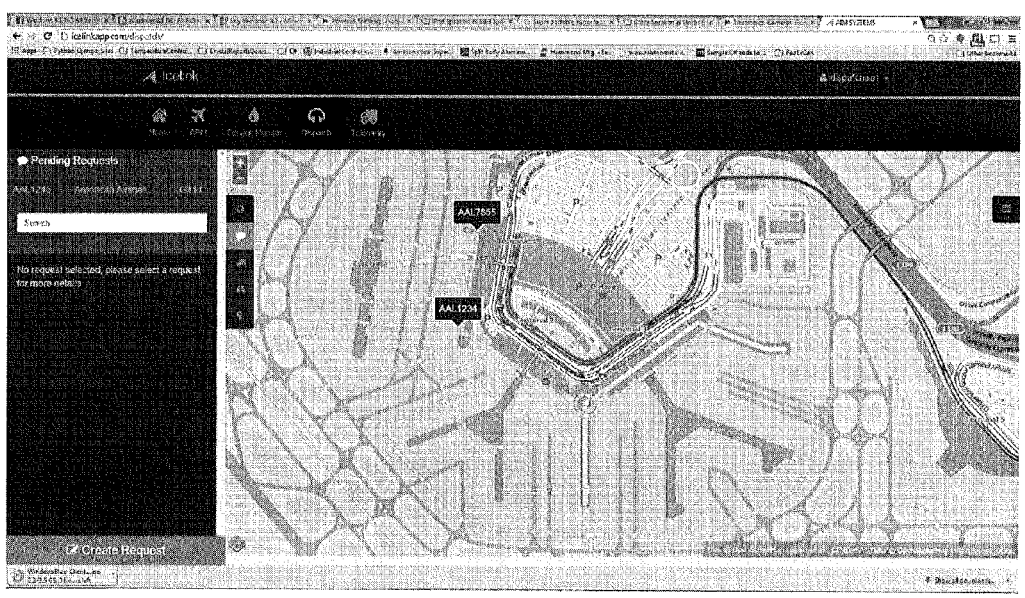
FIG. 22 is an example screenshot of a geospatial view of a dispatch screen.

Turning to FIG. 22, another example of a screenshot of a geospatial view is shown. As can be see, the location of each aircraft with accepted contamination removal requests are depicted by map pins with the flight number. This graphical depiction of the open request list aids the dispatch user in planning resources, and scheduling contamination removal.

Figure 23:
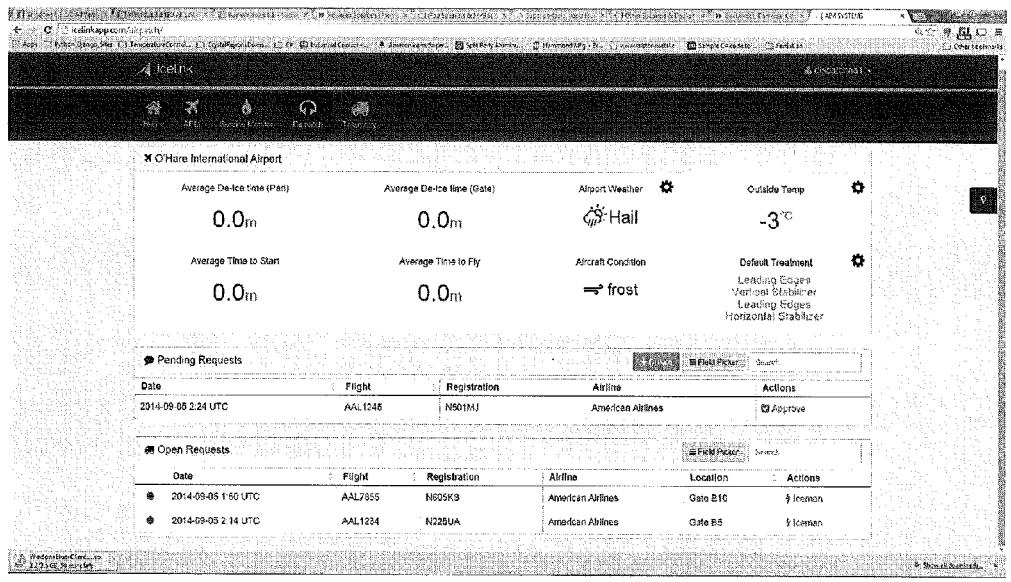
FIG. 23 is an example screenshot of a tabular view of a dispatch screen.

Turning to FIG. 23, an example screenshot of a dispatch screen is shown. In the current view, the dispatch screen shows both Pending Requests (from the pilot application or other datasource), and the Open Requests (those accepted but not completed). Colour coded dots in each row of the table indicate the state of the contamination removal process (not started, ready to go through contamination removal, in the process of contamination removal, and completed but not yet cleared by the dispatch user).

Figure 24:
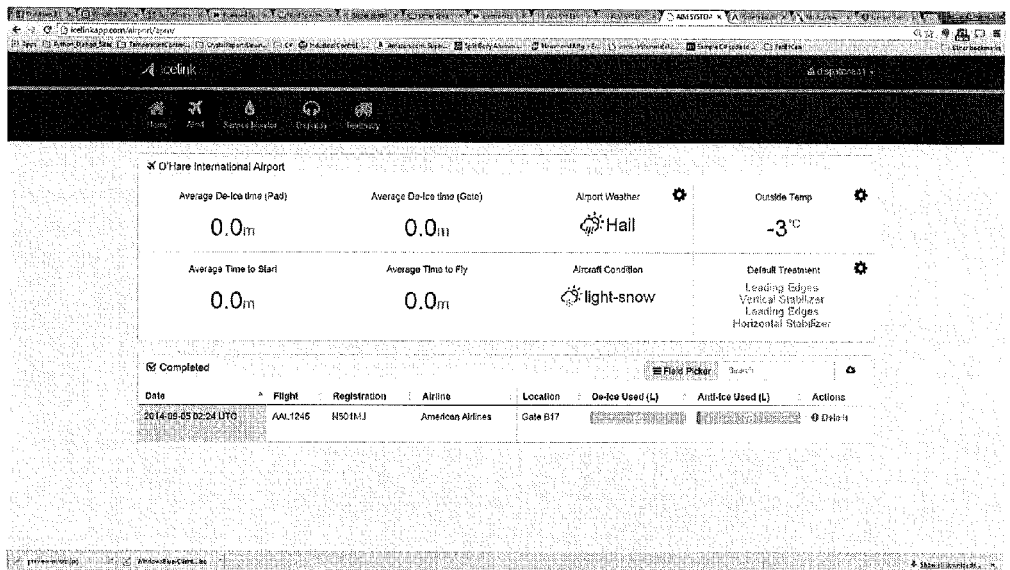
FIG. 24 is another example screenshot of a tabular view of a dispatch screen.

Turning to FIG. 24, yet another example screenshot of a dispatch screen is shown. A De-Icing Airport Monitor (DAPM), allows users to view a moving 3 hour average of the de-icing, or contamination removal, times, time to start (from push back), time to fly and de-icing time allowing the pilots and dispatch personnel to better co-ordinate the contamination removal operations, for example selecting the appropriate treatment(s) for the aircraft (choosing to use anti-icing and de-icing treatments, or just de-icing treatments as required based on time to flight and protection times provided by differing treatments), and controlling push back times (knowing if de-icing averages are every 15 min, not to release more aircraft to keep queue and taxiing times down).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for coordinating contamination removal on a surface of an aircraft, the method comprising:
 receiving an electronic contamination removal request;
 determining a physical location within an airport for contamination removal treatment;
 electronically transmitting physical location within the airport for contamination removal treatment to the aircraft;
 electronically receiving progress of contamination removal treatment; and
 electronically transmitting progress of contamination removal treatment to the aircraft;
 wherein the progress of contamination removal treatment is displayed on multiple displays to allow for close monitoring of the contamination removal treatment; and
 wherein the electronic contamination removal request includes at least one of desired deicing treatment, fluid to be used or aircraft surface to be treated.

2. The method of claim 1 further comprising:
 receiving ready signal confirmation from aircraft; and
 transmitting instruction to de-icing personnel.

3. The method of claim 1 wherein receiving the electronic contamination removal request comprises receiving the segments of the aircraft to be treated.

4. The method of claim 1 wherein receiving progress of contamination removal treatment comprises receiving segments of the aircraft which have been treated.

5. The method of claim 1 further comprising:
determining an exit location; and
transmitting exit location to the aircraft.

6. The method of claim 1 wherein receiving progress of contamination removal comprises determining quantity of de-icing chemical used.

7. The method of claim 6 further comprising:
determining if de-icing chemical is required to be refill.

8. The method of claim 6 further comprising:
determining if a chemical recovery vehicle is required.

9. The method of claim 1 wherein contamination removal treatment comprises de-icing or anti-icing.

10. A system for coordinating contamination removal off a surface of an aircraft by contamination removal personnel, the system comprising:
a request module adapted to receive a request for contamination removal;
a coordination module adapted to direct the aircraft and the contamination removal personnel to a physical location within an airport for contamination removal; and
a de-icing module adapted to track the contamination removal treatment
wherein request for contamination removal includes at least one of desired deicing treatment, fluid to be used or aircraft surface to be treated.

11. The system of claim 10 wherein the coordination module is further adapted to notify the contamination removal personnel when the aircraft is ready for the contamination removal treatment.

12. The system of claim 10 wherein the coordination module is further adapted to provide the contamination removal requirements of the aircraft to the contamination removal personnel.

13. The system of claim 10 wherein the de-icing module is further adapted to notify when segments of the aircraft de-icing have been completed.

14. The system of claim 10 wherein the de-icing module is further adapted to track the quantity of de-icing chemical used.

15. The system of claim 14 wherein the de-icing module is further adapted to notify when the contamination removal personnel is required to refill the de-icing chemical.

16. The system of claim 14 wherein the de-icing module is further adapted to notify when a chemical recovery vehicle is required.

17. The system of claim 10 wherein contamination removal treatment comprises de-icing or anti-icing.

* * * * *